United States Patent
Young

(10) Patent No.: US 7,639,662 B1
(45) Date of Patent: Dec. 29, 2009

(54) QUALITY OF SERVICE CONGESTION METRICS PROPAGATED USING ROUTING UPDATES SYSTEM AND METHOD

(75) Inventor: C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 731 days.

(21) Appl. No.: 10/666,772

(22) Filed: Sep. 19, 2003

(51) Int. Cl.
*H04J 3/00* (2006.01)

(52) U.S. Cl. .................. 370/345; 370/236; 370/353; 370/352; 370/202.01; 370/338; 370/474

(58) Field of Classification Search .................. 370/321, 370/252, 332, 338, 254, 236, 353, 352, 261, 370/202.01, 358, 474
See application file for complete search history.

(56) References Cited

U.S. PATENT DOCUMENTS

| | | | |
|---|---|---|---|
| 6,504,829 B1 | 1/2003 | Young et al. | 370/337 |
| 6,515,973 B1 | 2/2003 | Young | 370/329 |
| 6,574,199 B1 | 6/2003 | Young et al. | 370/254 |
| 6,574,206 B2 | 6/2003 | Young | 370/337 |
| 2002/0049039 A1* | 4/2002 | Natarajan | 455/62 |
| 2002/0085503 A1* | 7/2002 | Hulyalkar et al. | 370/252 |
| 2003/0198206 A1* | 10/2003 | Cain et al. | 370/337 |
| 2004/0203820 A1* | 10/2004 | Billhartz | 455/452.1 |
| 2004/0233855 A1* | 11/2004 | Gutierrez et al. | 370/252 |

* cited by examiner

*Primary Examiner*—Charles N Appiah
*Assistant Examiner*—Kwasi Karikari
(74) *Attorney, Agent, or Firm*—Matthew J. Evans; Daniel M. Barbieri

(57) ABSTRACT

A communications system is disclosed. The communication system includes a plurality of transceiver nodes configured to utilize a time division multiple access structure to communicate between the transceiver nodes. Each of the transceiver nodes generates congestion metric information based on the utilization of a link to each of its neighbors. A time division multiple access structure that includes a plurality of time slots during which the transceiver nodes are configured to communicate data cells is also disclosed. The data cells are transmitted from a transmission queue. The data cells include routing information and the congestion metric information.

19 Claims, 5 Drawing Sheets

QUALITY OF SERVICE CONGESTION METRICS PROPAGATED USING ROUTING UPDATES SYSTEM AND METHOD

STATEMENT REGARDING FEDERALLY SPONSORED RESEARCH OR DEVELOPMENT

The invention was made with U.S. Government support under contract no. DMB07-01-3-L533 and the U.S. Government has certain rights in this invention.

BACKGROUND

Mobile multi-hop broadcast packet radio networks are known for their rapid and convenient deployment, self organization, mobility, and survivability. In this type of network as illustrated in FIG. 1, a transmission from one node, for example node 1, is broadcast to all nodes in its "neighborhood". Ultra-high frequency (UHF) systems generally have a neighborhood defined by nodes within line of sight of the transmitting node (these nodes being termed within one "hop" of the transmitting node). For example, in FIG. 1 nodes 1, 3, 4, 5, 6, 7, and 8 make up one neighborhood. For data transmitted from node 1 to propagate multiple hops, the data must be relayed by one or more of node 1's neighbors. For example, node "a" (likewise nodes b, c, and g) is two hops away from the node 1 transmitter. The data will be relayed in this manner until it has arrived at all intended destination nodes.

Since there are generally limitations on the number of simultaneous transmissions that a receiver can successfully process (typically one), collisions can be avoided by the assignment of time slots in which individual nodes can transmit. There are many approaches to deciding which nodes are assigned which slots, and the approach is generally driven by the network applications, such as, broadcast, multicast, unicast, datagrams, virtual circuits, etc. Because the problem of optimally assigning slots in this environment is mathematically intractable, a heuristic approach is taken to design an integrated protocol that both chooses the number of slots to assign to each neighboring node and coordinates their activation in the network.

Tactical military and commercial applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. This functionality is provided by the Unifying Slot Assignment Protocol (USAP) which is the subject of U.S. Pat. No. 5,719,868, the disclosure of which is herein incorporated by reference. The function of USAP is to monitor the RF environment and allocate the channel resources on demand and automatically detect and resolve contention resulting from changes in connectivity.

It is therefore desirable for a wireless ad-hoc radio node network system to use a retransmission system, with desired efficiencies for retransmissions. Accordingly, there is a need for a route management system which disseminates congestion information about all routes in a subnet of nodes. Further, there is a need for a system and method that maximizes the likelihood that packets injected into a subnet will arrive intact at the destination.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a communications system. The communications system includes a plurality of transceiver nodes configured to utilize a time division multiple access structure to communicate between the transceiver nodes. Each of the transceiver nodes generates congestion metric information based on the utilization of the link to each of its neighbors. The time division multiple access structure includes a plurality of time slots during which the transceiver nodes are configured to communicate data cells, the data cells being transmitted from a transmission queue, the data cells including routing information and the congestion metric information.

Another example of the invention relates to a method of propagating congestion information in a transmission system. The transmission system comprises transceiver nodes. The method includes measuring by a node, the utilization of each of the links to each of its neighbors. The method also includes generating congestion metric information based on the link utilization. Further, the method includes combining the congestion metric information with routing information. Further still, the method includes transmitting the congestion metric information and routing information.

Yet another example of the invention relates to a radio transceiver propagating congestion information in a radio network system. The radio network system comprises radio transceiver nodes. The radio transceiver comprises a means for measuring by a node, the utilization of each of the links to each of its neighbors. The radio transceiver also comprises a means for generating congestion metric information based on the link utilization. Further, the radio transceiver comprises a means for combining the congestion metric information with routing information and a means for transmitting the congestion metric information and routing information.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
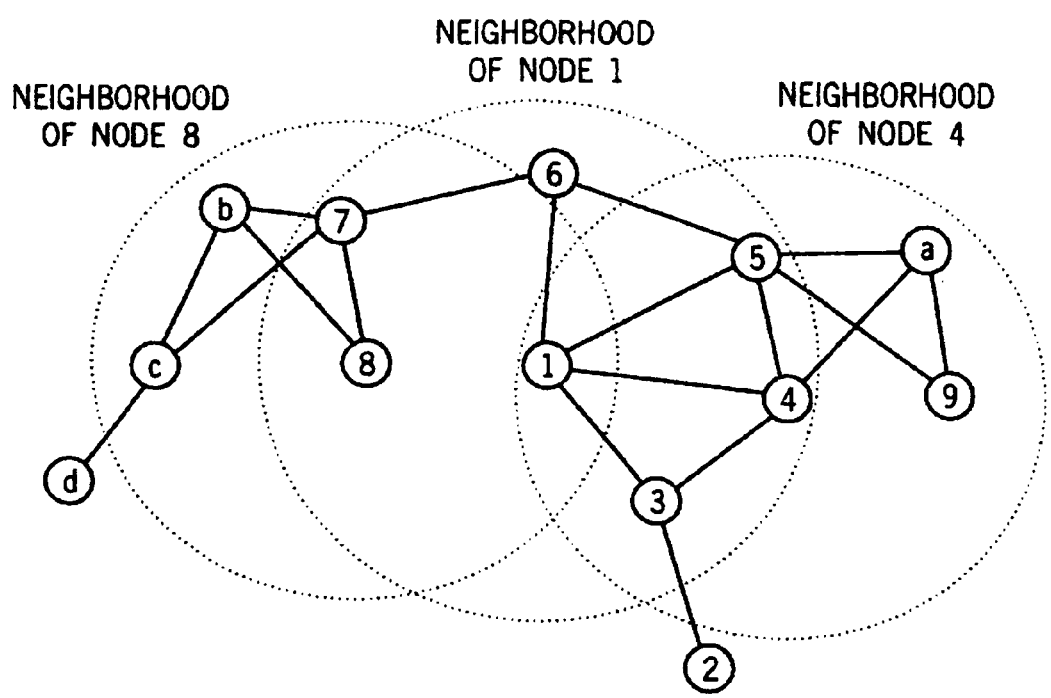
FIG. 1 is an exemplary depiction of an ad-hoc radio node network.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

A wireless networking engine (WNE) may be used for management purposes in an ad-hoc radio node network. The WNE is unique in its ability to manage dynamic, distributed, mobile radio networks. An internet protocol (IP) Quality of Service (QoS) mechanism adds significant new capabilities to deal with user data requirements in support of multimedia applications.

Figure 2:
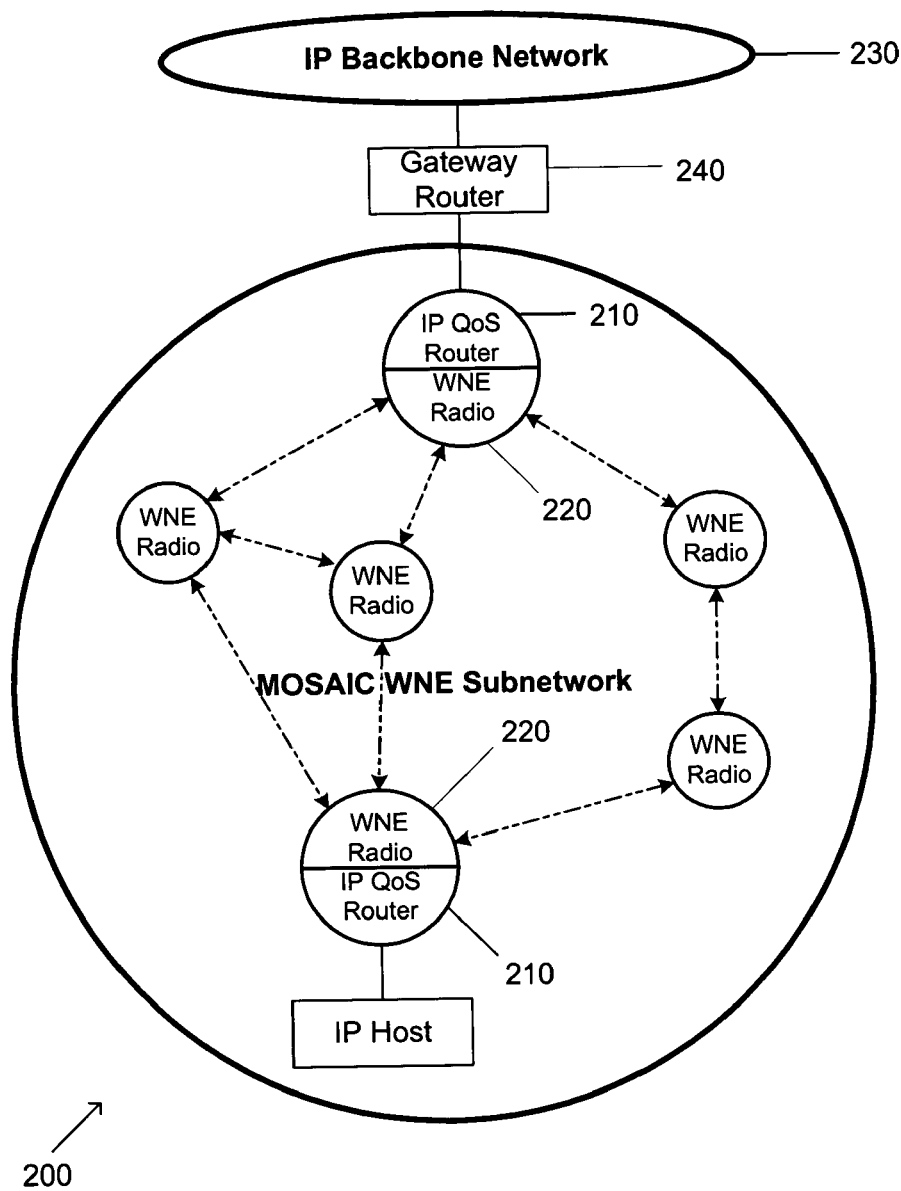
FIG. 2 is an exemplary depiction of an IP network and the WNE subnet.

According to an exemplary embodiment, an IP QoS Router 210 may be integrated with any WNE subnet radio node 220, which may connect with an IP backbone 230 via a Gateway Router 240. WNE radio network 200 plays a link layer function for transmitting IP packets between the routers 210, as depicted in FIG. 2.

Figure 3:
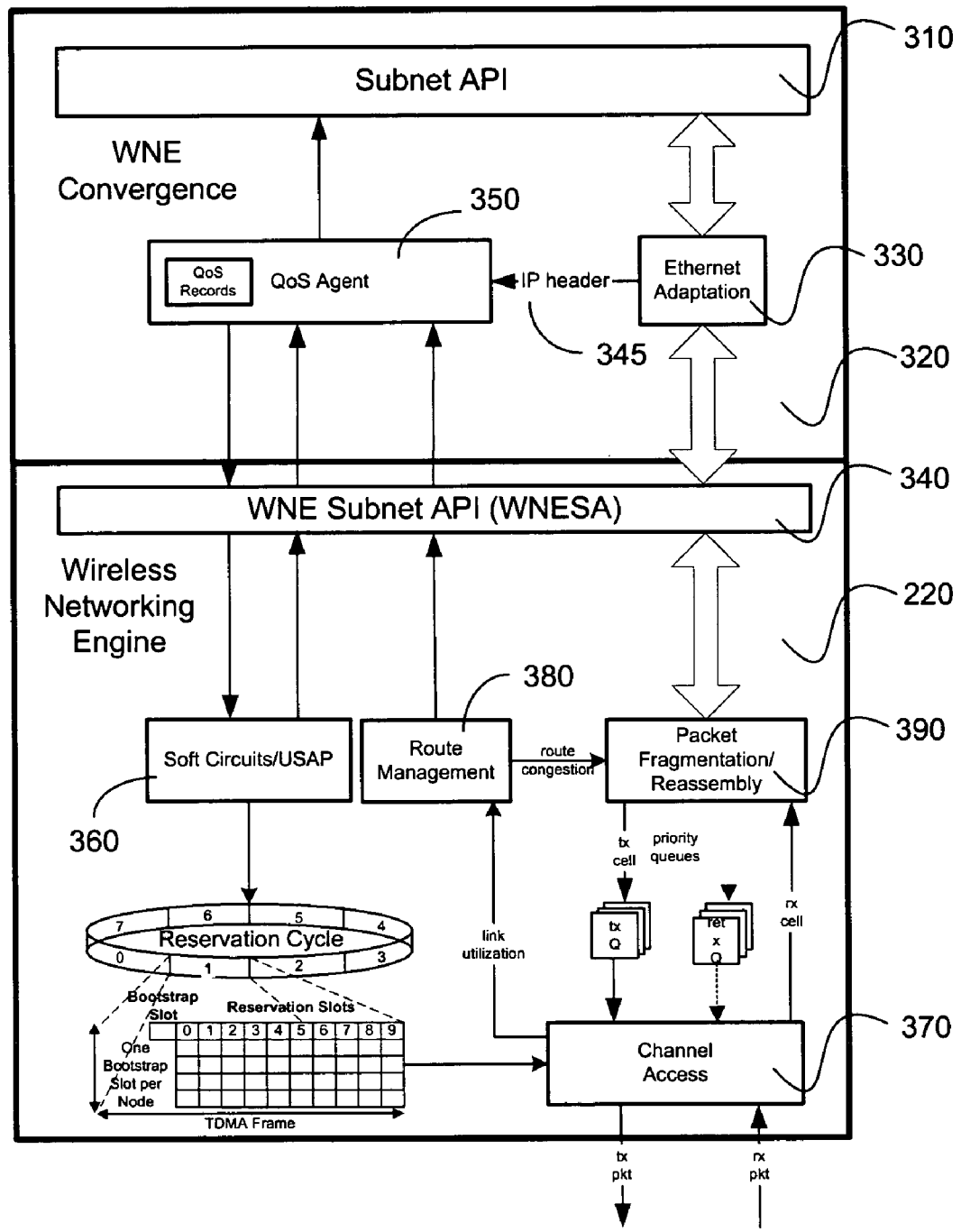
FIG. 3 is an exemplary depiction of the WNE subnet QoS processing system.

Referring to exemplary FIG. 3, IP QoS router 210 passes packets over the Subnet API 310 for QoS processing by a WNE Convergence 320. In an exemplary role as a transparent Ethernet bridge, WNE Convergence 320 examines all Ethernet packets entering and leaving the subnet 200. A driver herein called Ethernet Adaptation 330 intercepts the IP packets and passes them over the WNE Subnet API (WNESA) 340 for transmission. In the process it passes copies of the IP headers 345 to a QoS Agent 350, which handles circuit reservations based on the Differentiated Services (DiffServ) code point and bandwidth information. In particular, QoS Agent 350 performs the following functions:

Translates code points and bandwidth specs to internal bandwidth, priority, latency, and reliability parameters.

Manages reservation requests to the Unifying Slot Assignment protocol (USAP) 360 within WNE 220 in response to the bandwidth and latency specifications.

Issues flow control commands to the subnet interface in response to end-to-end congestion reports coming from WNE 220.

When it receives an IP header from the Ethernet Adaptation 330, QoS Agent 350 checks it for IP QoS compliance. If compliant, it contains a DiffServ code point that will get translated into WNE services.

QoS Agent 350 may be used to try to find the reservation in a QoS Record. If the reservation is not found, it stores the information into the QoS Record. Then it translates this to the WNE subnet QoS parameters and sends the reservation request over WNESA 340. The request includes the latency, priority, and bandwidth information. Since there can be numerous QoS flows passing through WNE 220, QoS Agent 350 increases efficiency by aggregating flows with the same code point and destination to a single Soft Circuit 360 reservation. The reservation response causes QoS Agent 350 to update the QoS Record to indicate success or failure.

A timer monitors the QoS Records. Whenever it expires, if there have been any new packets that arrive for a particular reservation, QoS Agent 350 sends a reservation request to keep it alive. Otherwise, it removes the QoS Record and the Soft Circuit dismantles itself.

To support flow control, QoS Agent 350 processes congestion reports from the WNE subnet. If the congestion is pertinent to one or more code points in its QoS Records, the QoS Agent forwards the information to Subnet API 310.

Still referring to FIG. 3, WNE QoS processing impacts numerous task modules:

Dynamic TDMA slot assignments by USAP 360 set up virtual circuits in response to the bandwidth requests coming from QoS Agent 350. Soft Circuits 360 maintain the slot assignments in the face of changing network topologies and accommodates traffic with low latency requirements.

Hop-by-hop acknowledgements and retransmissions along with enhanced destination reassembly buffering support traffic with increased reliability requirements.

End-to-end congestion reports identify paths to nodes that are congested. The packet fragmentation takes advantage of route congestion metrics to exert flow control on packets entering the source node.

According to an exemplary embodiment, the processing begins when packets enter WNE 220 and are fragmented into cells. If a packet is marked for reliable delivery, the cells are marked for hop-by-hop acknowledgments (HBH ACK) and retransmissions as necessary. The cells are then placed in the priority queues (tx Q) 400 that Channel Access 370 pulls from when it builds packets for transmission. After a cell is placed in a transmission packet, if it is marked HBH ACK it is placed in one of the retx Qs 410 to await retransmission if necessary, as further described below.

As IP packets are injected into the WNE subnet, if their code points indicate that a reservation is necessary, reservation requests cause Soft Circuits 360 to build up a circuit of allocated slots along the path from source to destination. USAP manages the allocations on every link in a way that efficiently uses channel resources (TDMA slots and frequency channels) while taking into account the priority and latency requirements of individual reservation requests.

In addition to its is responsibility for reliably transmitting cells marked HBH ACK, Channel Access 370 gathers link utilization metrics used to report congestion. It counts cells that are transmitted in the unicast and broadcast allocated slots and compares this against the total capacity of each link. This yields a link utilization metric. It also monitors the fullness of the priority queues and the availability of digital signal processor (DSP) buffers so that this can be factored into the congestion reports. One additional factor used to measure congestion is the availability of unallocated slots as reported by USAP 360.

Route management 380 is responsible for disseminating the congestion information about routes to destination nodes. Because it is already propagating routing information, it is advantageous to piggyback the congestion reports onto this mechanism. The same rules may be used to update the routes to the congestion reports so that only current information is used about the best route from every source to every destination.

A fragmentation and reassembly module 390 plays a role in QoS for packets both entering and leaving the network. On entry, the route to the packet destination is checked for congestion. If extreme congestion is indicated, the packet may be discarded unless it is has a FLASH code point. In that case the packet may be allowed to enter the network but the reliable flag is set FALSE. The reason for this is that once a route is extremely congested, which is characterized by overflowing queues and cells being discarded, hop-by-hop retransmissions tend to make things worse. Meanwhile, Soft Circuits 360 tries to establish a highest priority circuit for the FLASH traffic stream, which will probably alleviate the congestion along the route of this stream and once again allow for reliable delivery.

While a packet is being reassembled, it must be queued up to allow for cells that arrive out of order. The cells arriving late are caused by the delays inherent in retransmissions. Once a packet is complete it is delivered without delay to minimize latency. This means that packets can be delivered out of order. An extra layer of queuing may be added to provide in-order, reduced jitter packet delivery for those applications not affected by latency.

Finally, Soft Circuits 360 and USAP 360 come into play when building a circuit requiring reduced latency. Soft Circuits 360 propagates the reduced latency requirement along each hop of the path from source to destination. USAP 360 deals with this requirement by assigning additional slots to the circuit and spreading the slots in the TDMA frame to reduce the time that cells must wait in the queues before a transmit opportunity arrives. These mechanisms can reduce the average latency by 100 ms and more over the course of a multihop route.

As discussed earlier, route management 380 disseminates congestion information about all routes in the subnet. This information is then used to implement flow control at the source nodes to maximize the likelihood that packets injected into the subnet will arrive intact at the destination.

The process may be started with each node measuring the utilization of the link to each of its neighbors. This metric takes into account the number of cells transmitted in the currently allocated slots, the availability of slots for new allocations, and whether queues are overflowing or the supply of dsp buffers is exhausted. According to an exemplary embodiment, the metric may be reduced to 4 states so that the information can be transmitted in 2 bits:

0. Little or no utilization
1. Low utilization
2. Moderate to high utilization
3. Over-utilized—cells being dropped The two bits may then be piggybacked onto the routing information that gets reported back to all source nodes. The rules used to propagate the routing information without introducing route loops also insure that the congestion reports are timely and accurate.

Figure 4:
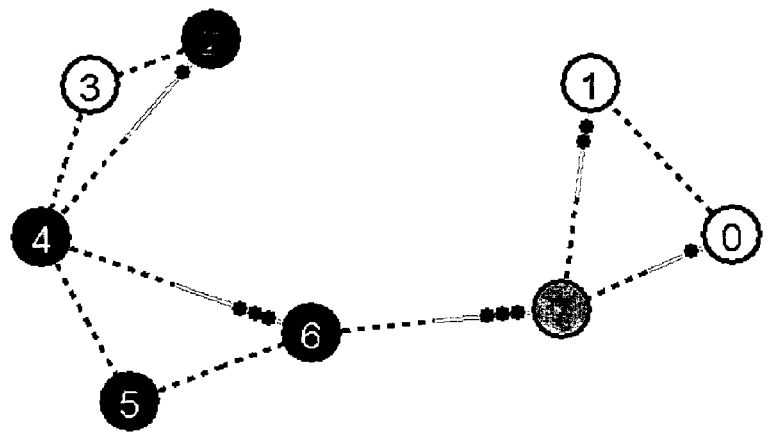
FIG. 4 is an exemplary depiction of a simulation of low to moderate traffic congestion for an exemplary subnet.
Figure 4:
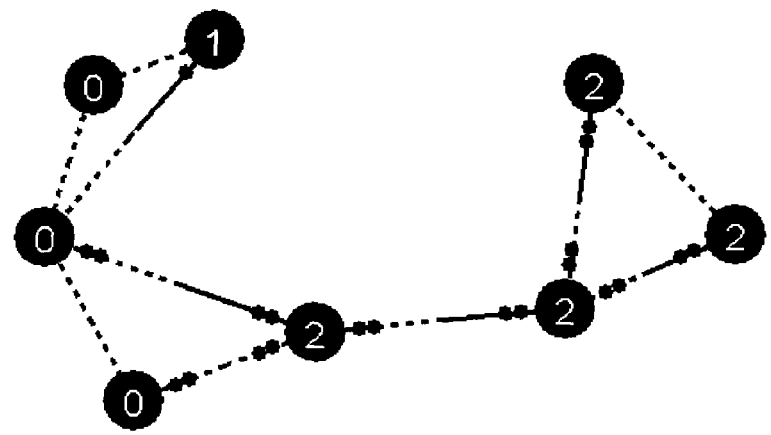

Referring now to FIG. 4, different views of the same simulated WNE network under moderate loading are depicted. The upper view uses the small dots to indicate the number of slots assigned on each link. The bottom view uses the number of dots to represent the utilization metric and the node numbers to show the congestion reported at each node with respect to node 4.

Nodes 0, 1, and 2 are all sending traffic to node 4, resulting in slots being assigned along the routes from these nodes to node 4. Note that the slots assigned by nodes 6 and 7 are the sum of the slots assigned by 0 and 1. In the bottom view it can be seen that there is a low to moderate amount of congestion at all nodes with respect to node 4.

Figure 5:
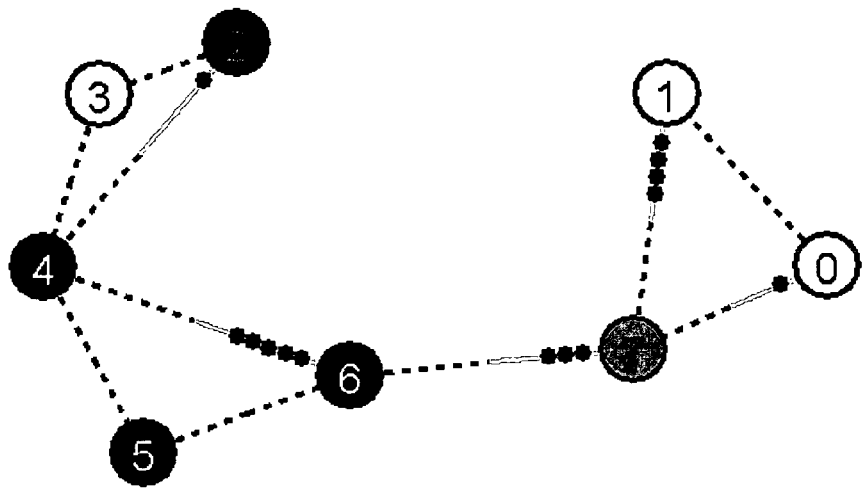
FIG. 5 is an exemplary depiction of a simulation of moderate to high traffic congestion for an exemplary subnet.
Figure 5:
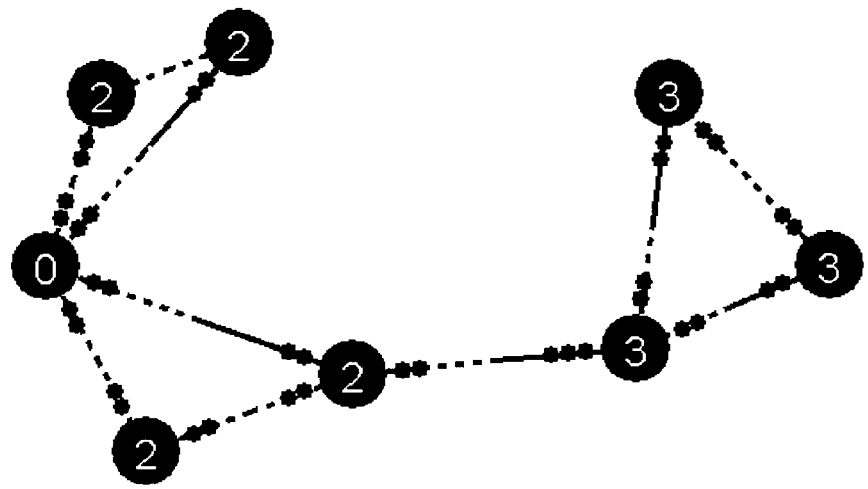

Referring now to FIG. 5 node 1 has doubled its traffic to node 4, causing more slots to be assigned along the path to 4. However, node 7 is unable to assign the additional capacity so that it now becomes a bottleneck. The lower view now shows the over-utilization at node 7 and how this propagates upstream back to the source nodes 0 and 1. In addition, the extra traffic to node 4 and the slots assigned by node 6 causes all nodes in the network, even those not on the over-utilized path, to raise their congestion with respect to node 4.

In accordance with an alternative embodiment, the invention disclosed is not limited to TDMA networks, but may be similarly applied to non-TDMA networks. In such systems, the congestion metric may be, for example, the percentage of time the channel is sensed as busy.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing and communication devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A communications system, comprising:
 a plurality of transceiver nodes configured to utilize a time division multiple access structure to communicate between the plurality of transceiver nodes, each transceiver node generating congestion metric information based on the utilization of a link to each of its neighbors;
 a route management module configured to combine the congestion metric information generated by the plurality of transceiver nodes into a congestion report;
 the route management module configured to combine routing information for each transceiver node and the congestion report into a plurality of node routing and congestion reports, the route management module is configured to transmit one of the plurality of node routing and congestion reports to each transceiver node based on the routing information;
 the time division multiple access structure including a plurality of time slots during which the plurality of transceiver nodes are configured to communicate data cells, the data cells being transmitted from a transmission queue, the data cells including routing information and the congestion metric information; and
 wherein the congestion metric information is based on comparing cell counts against a total capacity of each link, a monitoring signal of a processor buffer availability, and a monitoring signal of priority queues capacity.

2. The communication system of claim 1, wherein the congestion metric information is generated by a channel access subsystem.

3. The communication system of claim 1, wherein the cell counts are transmitted in unicast and broadcast allocated slots.

4. The communication system of claim 1, wherein the congestion metric information is further based on the availability of unallocated slots.

5. A method of propagating congestion information in a transmission system, the transmission system comprising transceiver nodes, comprising:
 measuring by the transceiver node, the utilization of each of the links to each of its neighbors;
 generating congestion metric information based on the link utilization;
 combining the congestion metric information with routing information;
 transmitting the congestion metric information and routing information; and wherein the congestion metric information is based on comparing cell counts against a total capacity of each link, a monitoring signal of a processor buffer availability, and a monitoring signal of priority queues capacity.

6. The method of claim 5, wherein the congestion metric information is provided as one of a predetermined number of states.

7. The method of claim 6, wherein the predetermined number of states is four.

8. The method of claim 5, wherein a route management subsystem disseminates the congestion metric information.

9. The method of claim 5, wherein a flow control subsystem of a second transceiver node may utilize the congestion metric information when received by the second transceiver node.

10. The method of claim 5, wherein the congestion metric information and routing information is transmitted by a route management subsystem.

11. The method of claim 5, wherein the congestion metric information is generated by a channel access subsystem.

12. The method of claim 5, wherein the transmission system is a time division multiple access system.

13. A radio transceiver propagating congestion information in a radio network system, the radio network system comprising radio transceiver nodes, comprising:

a means for measuring by the transceiver node, the utilization of each of the links to each of its neighbors;

a means for generating congestion metric information based on the link utilization;

a means for combining the congestion metric information with routing information;

a means for transmitting the congestion metric information and routing information; and wherein the congestion metric information is based on comparing cell counts against a total capacity of each link, a monitoring signal of a processor buffer availability, and a monitoring signal of priority queues capacity.

14. The radio transceiver of claim 13, wherein the congestion metric information is provided as one of a predetermined number of states.

15. The radio transceiver of claim 14, wherein the predetermined number of states is four.

16. The radio transceiver of claim 13, wherein a route management subsystem disseminates the congestion metric information.

17. The radio transceiver of claim 13, wherein a flow control subsystem of a second transceiver node may utilize the congestion metric information when received by the second transceiver node.

18. The radio transceiver of claim 13, wherein the congestion metric information is generated by a channel access subsystem.

19. The radio transceiver of claim 13, wherein the radio network system is a time division multiple access system.

\* \* \* \* \*